(12) United States Patent
Feulner et al.

(10) Patent No.: US 11,391,205 B2
(45) Date of Patent: *Jul. 19, 2022

(54) ANTI-ICING CORE INLET STATOR ASSEMBLY FOR A GAS TURBINE ENGINE

(71) Applicant: RAYTHEON TECHNOLOGIES CORPORATION, Hartford, CT (US)

(72) Inventors: Matthew R. Feulner, West Hartford, CT (US); Shengfang Liao, Farmington, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 1919 days.

This patent is subject to a terminal disclaimer.

(21) Appl. No.: 14/959,542

(22) Filed: Dec. 4, 2015

(65) Prior Publication Data

US 2016/0084106 A1    Mar. 24, 2016

Related U.S. Application Data

(63) Continuation of application No. 13/366,419, filed on Feb. 6, 2012, now Pat. No. 9,291,064.

(Continued)

(51) Int. Cl.
*F02C 7/04* (2006.01)
*F02C 7/047* (2006.01)
(Continued)

(52) U.S. Cl.
CPC .............. *F02C 7/04* (2013.01); *F01D 9/04* (2013.01); *F01D 25/24* (2013.01); *F02C 7/047* (2013.01);
(Continued)

(58) Field of Classification Search
CPC ..... F02C 7/04; F02C 7/047; F01D 9/04; F01D 25/02; B64D 2033/0233
See application file for complete search history.

(56) References Cited

U.S. PATENT DOCUMENTS 3,988,798 A    11/1976    Kratt
4,827,712 A    5/1989    Coplin
(Continued)

FOREIGN PATENT DOCUMENTS

EP    2022948 A2    2/2009
EP    2392777 A2    12/2011
(Continued)

OTHER PUBLICATIONS

Robichaud et al., "The Weather of Atlantic Canada and Eastern Quebec, Graphic Area Forecast 34," Nav Canada, Jan. 2002, pp. 1-20.*

(Continued)

*Primary Examiner* — Lorne E Meade
(74) *Attorney, Agent, or Firm* — Carlson, Gaskey & Olds, P.C.

(57) ABSTRACT

A gas turbine engine is defined wherein the inlet guide vanes leading into a core engine flow path are sized and positioned such that flow paths positioned circumferentially intermediate the vane are sufficiently large that a hydraulic diameter of greater than or equal to about 1.5 is achieved. This will likely reduce the detrimental effect of icing.

5 Claims, 2 Drawing Sheets

Related U.S. Application Data

(60) Provisional application No. 61/593,083, filed on Jan. 31, 2012.

(51) Int. Cl.
 F01D 9/04 (2006.01)
 F01D 25/24 (2006.01)
 F01D 25/02 (2006.01)
 B64D 33/02 (2006.01)

(52) U.S. Cl.
 CPC ...... *B64D 2033/0233* (2013.01); *F01D 25/02* (2013.01); *F05D 2220/32* (2013.01)

(56) References Cited

U.S. PATENT DOCUMENTS

| | | | |
|---|---|---|---|
| 5,267,397 | A | 12/1993 | Wilcox |
| 5,279,109 | A | 1/1994 | Liu et al. |
| 5,370,501 | A | 12/1994 | Udall |
| 5,740,674 | A | 4/1998 | Beutin et al. |
| 6,561,760 | B2 | 5/2003 | Wadia et al. |
| 7,025,563 | B2 | 4/2006 | Servadio et al. |
| 7,574,856 | B2 * | 8/2009 | Mak .................... F01K 23/10 60/39.182 |
| 7,694,505 | B2 | 4/2010 | Schilling |
| 7,780,398 | B2 | 8/2010 | Dervaux et al. |
| 7,806,652 | B2 | 10/2010 | Major et al. |
| 8,074,440 | B2 | 12/2011 | Kohlenberg et al. |
| 9,291,064 | B2 * | 3/2016 | Feulner .................... F02C 7/047 |
| 2009/0092482 | A1 | 4/2009 | Winter |
| 2009/0242549 | A1 | 10/2009 | Hogate |
| 2009/0260345 | A1 | 10/2009 | Chaudhry |
| 2010/0043390 | A1 | 2/2010 | Jain et al. |
| 2011/0151186 | A1 | 6/2011 | Lambourne et al. |

FOREIGN PATENT DOCUMENTS

| | | |
|---|---|---|
| GB | 2406142 A | 3/2005 |
| JP | 2011021506 A | 2/2011 |

OTHER PUBLICATIONS

Shires et al., "The Icing of Compressor Blades and their Protection by Surface Heating", Aeronautical Research Council Reports and Memoranda, R&M No. 3041, London, 1958, pp. 1-42.*

Jane's Aero-Engines, Issue Seven, Edited by Bill Gunston, Jane's Information Group Inc., Alexandria, Virginia, 2000, pp. 1-67 & 510-512.*

Wilfert, Gunter, "Geared Fan", Aero-Engine Design: From State of the Art Turbofans Towards Innovative Architectures, von Karman Institute for Fluid Dynamics, Belgium, Mar. 3-7, 2008, pp. 1-26.*

Hall, C.A., and Crichton, D., "Engine Design Studies for a Silent Aircraft", Journal of Turbomachinery, vol. 129, Jul. 2007, pp. 479-487.*

Rauch, D., "Design Study of an Air Pump and Integral Lift Engine ALF-504 Using the Lycoming 502 Core", NASA Report CR-120992, NASA Lewis Research Center, Cleveland, Ohio, 1972, pp. 1-182.*

Read, Bill, "Powerplant Revolution", AeroSpace, May 2014, pp. 28-31.*

Warwick, G., "Civil Engines: Pratt & Whitney gears up for the future with GTF", Flight International, Nov. 2007.*

Coy, Peter, "The Little Gear That Could Reshape the Jet Engine", Bloomberg Business, Oct. 15, 2015, pp. 1-4 [accessed on Nov. 10, 2015 at http://www.bloomberg.com/news/articles/2015-10-15/pratt-s-purepower-gtf-jet-engine-innovation-took-almost-30-years].*

Wendus, et al., "Follow-On Technology Requirement Study for Advanced Subsonic Transport", NASA/CR-2003-212467, Aug. 2003, pp. 1-58.*

Eric Adams, "The World's Hugest Jet Engine is Wider than a 737's Fuselage", Apr. 28, 2016 (www.wired.com/2016/04/worlds-hugest-jet-engine-wider-737s-fuselage/ accessed on Apr. 28, 2016).*

Wemming, H., "Validation and Integration of a Rubber Engine Model into an MDO Environment", Linkoping University, Sweden, 2010, pp. 1-90.*

Robichaud et al., "The Weather of Atlantic Canada and Eastern Quebec, Graphic Area Forecast 34," Jan. 31, 2002, pp. 9-49.

Cleynen, Olivier, "Fan blades and inlet guide vanes of DEnx-2B.jpg—Wikimedia Commons," Jun. 21, 2011.

Supplementary European Search Report for European Application No. 13775336.4.

Observations in preparation for the oral proceedings in European Patent Application No. 2809913 (13775336.4) by Safran Aircraft Engines dated Sep. 10, 2021. [with English translation].

Brief Communication in European Patent Application No. 13775336.4 by Safran Aircraft Engines dated Sep. 24, 2021. [with English translation].

Decision Revoking the European Patent No. EP2809913 dated Feb. 1, 2022.

* cited by examiner

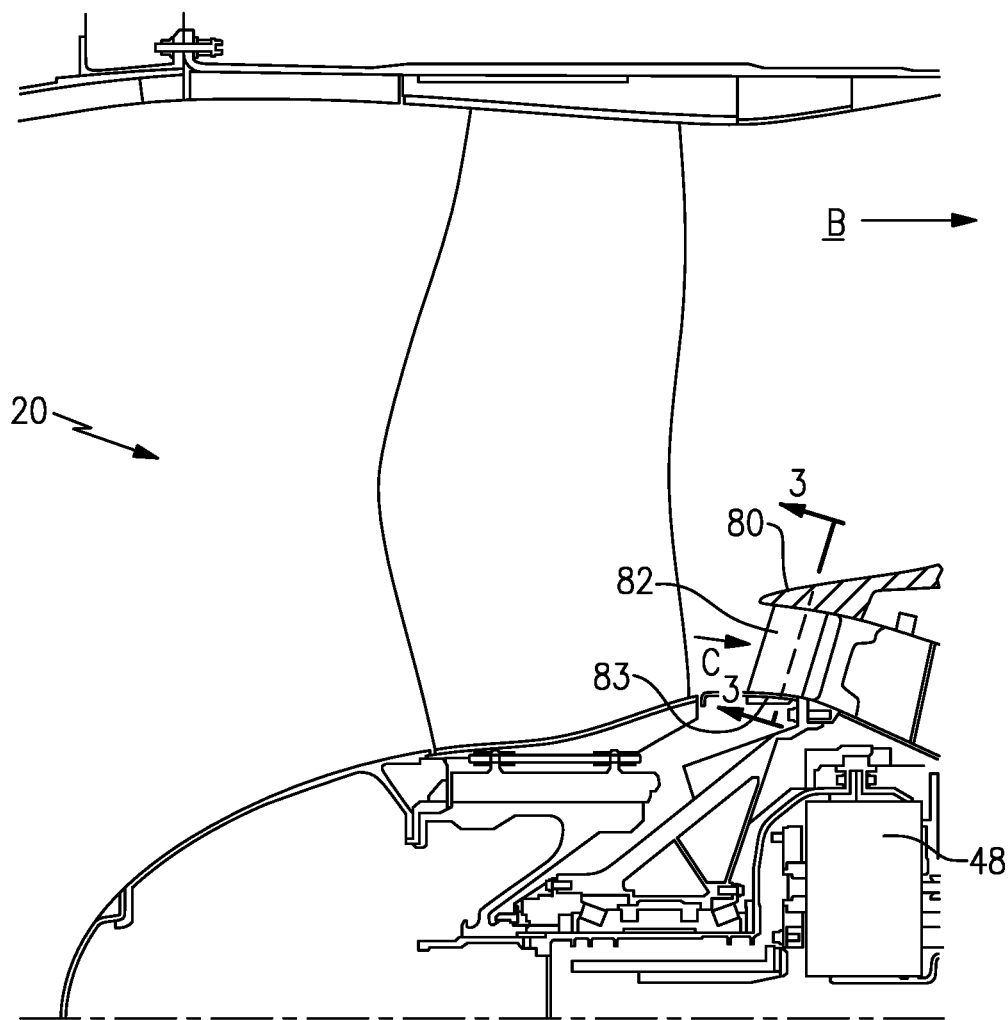
FIG.2
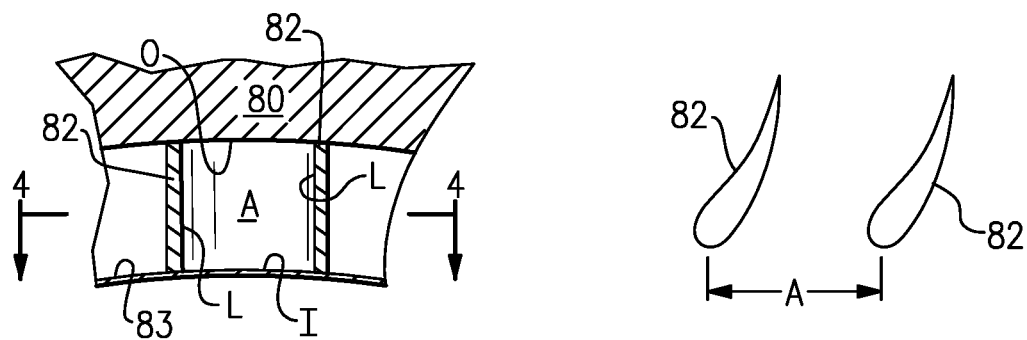
FIG.3
FIG.4

ANTI-ICING CORE INLET STATOR ASSEMBLY FOR A GAS TURBINE ENGINE

CROSS-REFERENCE TO RELATED APPLICATION

This application is a continuation of U.S. application Ser. No. 13/366,419, filed Feb. 6, 2012, which claims priority to U.S. Provisional Application No. 61/593,083, filed Jan. 31, 2012.

BACKGROUND OF THE INVENTION

This application relates to a gas turbine engine, wherein the size and number of core inlet stator vanes at an upstream end of a compressor section are positioned to minimize icing concerns.

Gas turbine engines are known, and typically include a fan delivering air into a compressor section as core flow, and also to a bypass path. The air entering the compressor section typically passes across inlet stator vanes, and towards a compressor rotor. The air is compressed in the compressor section, delivered into a combustion section, mixed with fuel and ignited. Products of this combustion pass downstream over turbine rotors, driving the rotors to rotate, and in turn drive the compressor and fan sections.

In one traditional type of gas turbine engine, a low pressure turbine drives a low pressure compressor, and a high pressure turbine drives a high pressure compressor. The low pressure turbine typically also drives the fan blade through a low spool. In such engines, the fan blade and low pressure compressor were constrained to rotate at the same speed as the low pressure turbine.

More recently, it has been proposed to incorporate a gear reduction between the low spool and the fan blade such that the fan blade may rotate at a distinct speed relative to the low pressure turbine. Such engines have a gear reduction typically positioned inwardly of a core engine gas flow.

One concern with gas turbine engines when utilized on airplanes is that ice may be passed downstream into the core flow. The ice may accumulate on an outer housing, known as a splitter, which defines an outer periphery of the core flow, and on the stator vanes. When the ice builds up, this is undesirable. The problem becomes particularly acute with a geared turbofan, as the core flow tends to be across a smaller cross-sectional area then in the prior systems.

SUMMARY

In a featured embodiment, a gas turbine engine has a fan, a turbine operatively connected to the fan, an inner core housing having an inner periphery, and a splitter housing having an outer periphery. The inner periphery of the inner core housing and the outer periphery of the splitter housing define a core path. A plurality of inlet stator vanes is located in the core path and each has a leading edge and a trailing edge. The inner periphery of the inner core housing, the outer periphery of the splitter housing and the leading edge of adjacent ones of the plurality of inlet stator vanes define a flow area having a hydraulic diameter. The hydraulic diameter of the flow area is greater than or equal to about 1.5 inches (3.8 centimeters).

In another embodiment according to the previous embodiment, the hydraulic diameter is greater than or equal to about 1.7 inches (4.3 centimeters).

In another embodiment according to the previous embodiment, the turbine is a low pressure turbine which also drives a low pressure compressor, and the fan as a low spool.

In another embodiment according to the previous embodiment, the low spool drives the fan through a gear reduction.

In another embodiment according to the previous embodiment, the gear reduction is positioned inwardly of the inner core housing.

In another embodiment according to the previous embodiment, the gear reduction has a gear reduction ratio greater than 2.3.

In another embodiment according to the previous embodiment, the gear reduction has a gear ratio of greater than 2.5.

In another embodiment according to the previous embodiment, the fan also delivers air into a bypass duct.

In another embodiment according to the previous embodiment, a bypass ratio of the amount of air delivered into the bypass duct compared to the amount of air delivered into the core path is greater than about 6.

In another embodiment according to the previous embodiment, the bypass ratio is greater than 10.

In another embodiment according to the previous embodiment, the fan has an outer diameter that is larger than an outer diameter of the rotors in the low pressure compressor.

In another embodiment according to the previous embodiment, the low pressure turbine has a pressure ratio that is greater than about 5:1.

In another featured embodiment, a gas turbine engine has a fan that delivers air into a core path and into a bypass duct as bypass air. The air in the core path reaches a low pressure compressor, and then a high pressure compressor. The air that is compressed by the high pressure compressor is delivered into a combustion section where it is mixed with fuel and ignited. Products of the combustion pass downstream over a high pressure turbine and then a low pressure turbine. The low pressure turbine drives the low pressure compressor as a low spool. A gear reduction is driven by the low spool to in turn drive the fan at a rate of speed lower than that of the low spool. An inner core housing defines an inner periphery of the core path. A splitter housing defines an outer periphery of the core path. A plurality of inlet stator vanes extend between the splitter and the inner core housing. There is a flow area between adjacent stator vanes, wherein a hydraulic diameter is defined as: Hydraulic diameter=$(4 \times A)/(O+L+I+L)$, where A is the area between the leading edge of one vane, the leading edge of an adjacent vane, the inner periphery of the splitter, and the outer periphery of the inner core housing. L is the length of the leading edge of each vane. I is the length of the inner periphery of the vanes and O is the length of the outer periphery between adjacent vanes. The hydraulic diameter is greater than or equal to about 1.5 inches (3.8 centimeters).

In another embodiment according to the previous embodiment, the hydraulic diameter is greater than or equal to about 1.7 inches (4.3 centimeters).

In another embodiment according to the previous embodiment, the gear reduction is positioned inwardly of the inner core housing.

In another embodiment according to the previous embodiment, a bypass ratio of the amount of air delivered into the bypass duct compared to the amount of air delivered into the core path is greater than about 6.

In another embodiment according to the previous embodiment, the bypass ratio is greater than 10.

In another embodiment according to the previous embodiment, the gear reduction has a gear reduction ratio greater than 2.3.

In another embodiment according to the previous embodiment, the low pressure turbine has a pressure ratio that is greater than about 5:1.

In another embodiment according to the previous embodiment, the gear reduction has a gear reduction ratio greater than 2.3.

In another featured embodiment, a compressor module has a compressor rotor, a plurality of inlet stator vanes adjacent the rotor, a flow area defined between leading edges of two adjacent stator vanes, and an outer boundary and an inner boundary. The hydraulic diameter is greater than or equal to about 1.5 inches (3.8 centimeters).

In another embodiment according to the previous embodiment, the hydraulic diameter is greater than or equal to about 1.7 inches (4.3 centimeters).

These and other features may be best understood from the following drawings and specification.

BRIEF DESCRIPTION OF THE DRAWINGS

FIG. 2 is a cross-sectional view through an upstream end of a gas turbine engine.

FIG. 3 is a forward view of a portion of the FIG. 2 gas turbine engine.

FIG. 4 is a schematic view.

DETAILED DESCRIPTION

Figure 1:
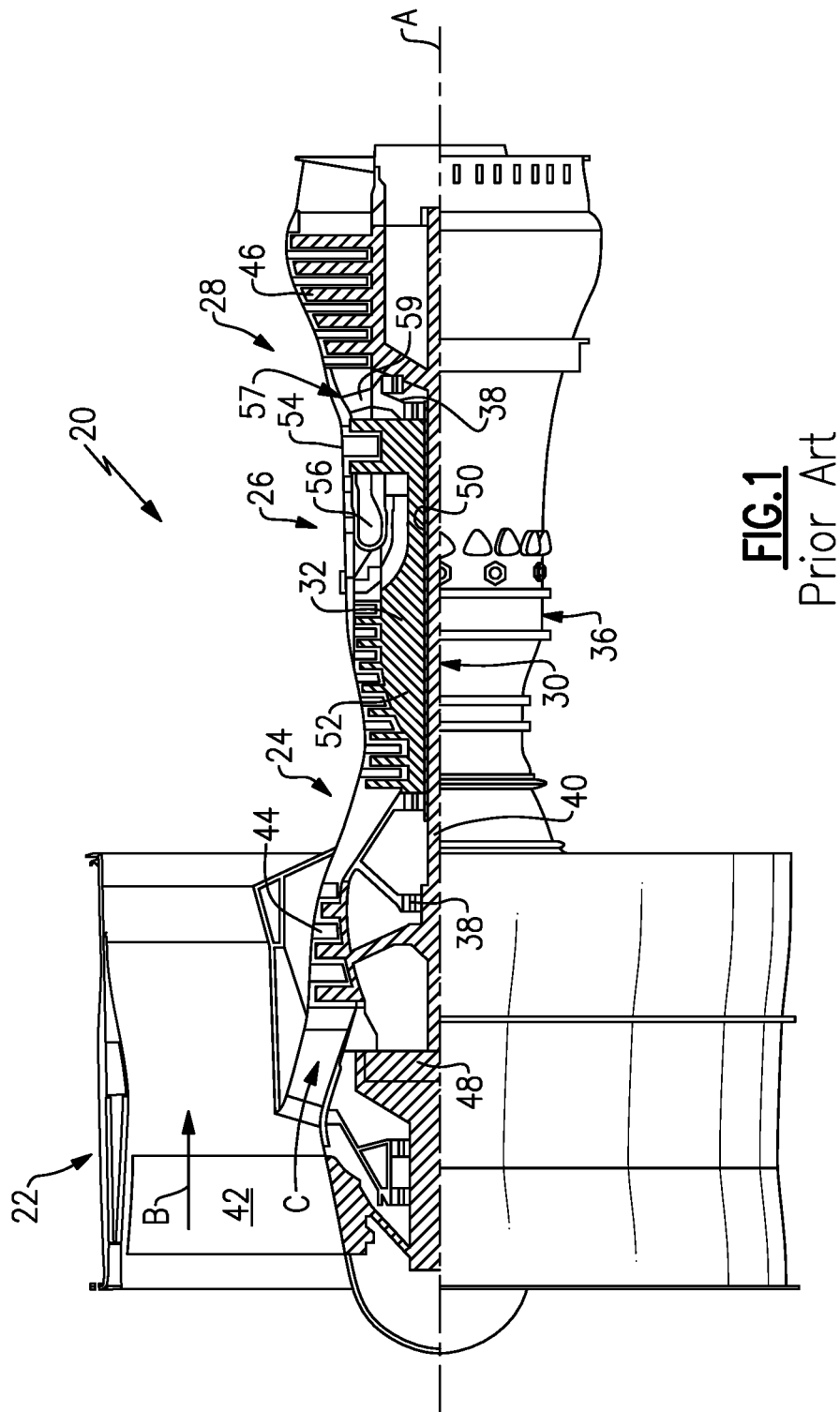
FIG. 1 shows a gas turbine engine somewhat schematically.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path while the compressor section 24 drives air along a core flow path for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

FIG. 2 shows a portion of the gas turbine engine 20. In particular, an outer housing, known as a splitter 80 defines an outer periphery for the core flow path C. A row of stator vanes 82 is positioned at a forward end. Air from the fan blade is divided into the bypass flow path B, and into the core flow path C, as mentioned above. The gear reduction 48 is positioned inwardly of an inner housing 83.

As shown in FIGS. 3 and 4, the spacing and number of stator vanes 82 is selected such that the total flow area A between the vanes 82 is selected to reduce the likelihood of icing. As shown, a pair of spaced vanes 82 are circumferentially spaced by area A. The area A is defined by a leading edge L of one vane 82, a leading edge L of an adjacent vane 82, the inner periphery O of the splitter 80, and the outer periphery I of the inner housing 83. A perimeter is defined by the sum of L, O, L and I. The hydraulic diameter may be defined as 4 times the area A divided by the perimeter. This would be equation 1 as follows:

$$\text{Hydraulic diameter} = (4 \times A)/(O+L+I+L) \quad \text{Equation 1}$$

The hydraulic diameter is desirably greater than or equal to about 1.5 inches (3.8 centimeters). In preferred embodiments, it would be greater than or equal to about 1.7 inches (4.3 centimeters).

The hydraulic diameter can be calculated for a compressor module in a similar manner by measuring the leading edges and measuring the distances along the outer and inner boundaries of the flow area, even though the module is not mounted in a splitter or outward of an inner housing.

Of course, FIG. 3 shows a small circumferential segment, and it should be understood that the spacing would typically be equal across the entire circumference.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a fan;
a turbine operatively connected to the fan;
an inner core housing having an inner periphery;
a splitter housing defining a bypass duct and having an outer periphery, the inner periphery of the inner core housing and the outer periphery of the splitter housing defining a core path;
a plurality of inlet stator vanes located in the core path and each having a leading edge and a trailing edge; and
wherein the inner periphery of the inner core housing, the outer periphery of the splitter housing and the leading edge of adjacent ones of the plurality of inlet stator vanes define a flow area having a hydraulic diameter, and said hydraulic diameter of the flow area is greater than or equal to 1.7 inches (4.3 centimeters).

2. A gas turbine engine comprising:
a fan delivering air into a core path and into a bypass duct as bypass air, said air in said core path reaching a low pressure compressor, and then a high pressure compressor, air compressed by said high pressure compressor being delivered into a combustion section where it is mixed with fuel and ignited, products of the combustion passing downstream over a high pressure turbine and then a low pressure turbine, said low pressure turbine driving said low pressure compressor as a low spool, and a gear reduction being driven by said low spool to in turn drive said fan at a rate of speed lower than that of said low spool, an inner core housing which defines an inner periphery of the core path, and;
a splitter housing defining the bypass duct and an outer periphery of the core path, a plurality of inlet stator vanes extending between said splitter and said inner core housing, and there being a flow area between adjacent stator vanes, wherein a hydraulic diameter is defined as:

$$\text{Hydraulic diameter} = (4 \times A)/(O+L+I+L),$$

wherein A is the area between the leading edge of one vane, the leading edge of an adjacent vane, the inner periphery of the splitter, and the outer periphery of the inner core housing, L is the length of the leading edge of each vane, I is the length of the inner periphery of the vanes and O is the length of the outer periphery between adjacent vanes, and wherein said hydraulic diameter is greater than 1.5 inches (3.8 centimeters).

3. The gas turbine engine as set forth in claim 2, wherein said gear reduction is positioned inwardly of said inner core housing.

4. The gas turbine engine as set forth in claim 3, wherein said hydraulic diameter is greater than 1.7.

5. A compressor module comprising:
a compressor rotor;
a plurality of inlet stator vanes adjacent the rotor; and
a flow area defined between leading edges of two adjacent stator vanes, and an outer boundary and an inner boundary, the outer boundary defined by a splitter housing that divides flow between a bypass flow path and a core flow path defined by the two adjacent stator vanes, and wherein a hydraulic diameter of the flow area is greater than or equal to 1.7 inches (4.3 centimeters).

\* \* \* \* \*